United States Patent [19]

Daily, III

[11] 4,390,002
[45] Jun. 28, 1983

[54] HINGE FOR COVER OF KETTLE COOKER

[75] Inventor: Virgil W. Daily, III, Paris, Ill.

[73] Assignee: Unarco Industries, Inc., Chicago, Ill.

[21] Appl. No.: 292,920

[22] Filed: Aug. 14, 1981

[51] Int. Cl.³ .................. A47J 37/07; E05D 11/06
[52] U.S. Cl. .................... 126/25 R; 16/348;
 16/360; 16/373; 16/386; 220/85 CH
[58] Field of Search ............... 16/319, 343, 348, 357,
 16/360, 361, 373, 386; 126/25 R, 25 A, 25 AA,
 26; 220/85 CH, 334, 335, 337, 342

[56] References Cited
U.S. PATENT DOCUMENTS

| | | | |
|---|---|---|---|
| 2,850,760 | 9/1958 | Vanderwalker | 16/360 |
| 3,611,915 | 10/1971 | Glaser et al. | 126/25 R X |
| 3,617,022 | 11/1971 | Wiggens | 126/25 R X |
| 3,688,758 | 9/1972 | Stephen, Jr. | 126/25 A X |
| 3,692,012 | 9/1972 | Wiggens | 126/25 R |
| 3,714,937 | 2/1973 | Linstead | 16/357 X |

Primary Examiner—Fred Silverberg
Attorney, Agent, or Firm—Clement and Ryan

[57] ABSTRACT

A kettle cooker hinge which comprises two spaced legs joined by a bight section to form an inverted U-shaped member which has fully closed, partially opened and fully opened positions. A first mechanism is provided for pivotally securing the lower end of each of the legs to the inner wall of the kettle at opposite sides thereof. The locations of these first pivot mechanisms lie in a first pair of adjacent quadrants of the kettle. A second mechanism for pivotally securing the bight at the upper end of the inverted U-shaped member to the inner wall of the cover is provided at a location directly above the other two quadrants of the kettle when the cover and the inverted U-shaped member are in their closed positions. This second mechanism extends, for stability, on opposite sides of the vertical plane that divides the other two quadrants of the kettle. The bight lies outside the kettle when the inverted U-shaped member is in its fully opened position. Preferred locations and configurations of the pivot mechanism at the top and bottom of the legs of the inverted U-shaped member are disclosed. In the preferred embodiment, a clip is provided for detachable connection with the rim of the kettle, so that the cover may be held in a generally upright position short of being swung on the hinge so as to be completely free of the kettle in a fully upright position.

15 Claims, 6 Drawing Figures

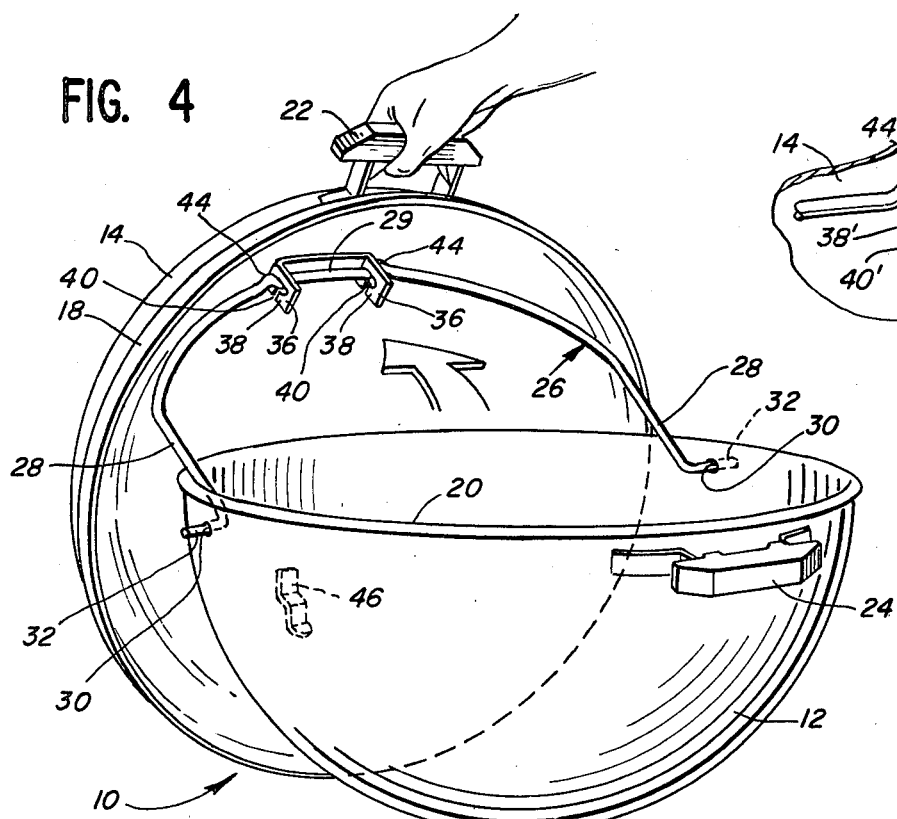
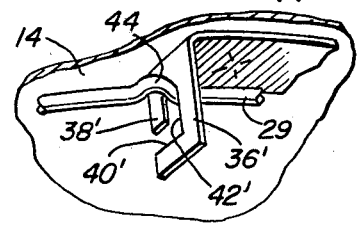
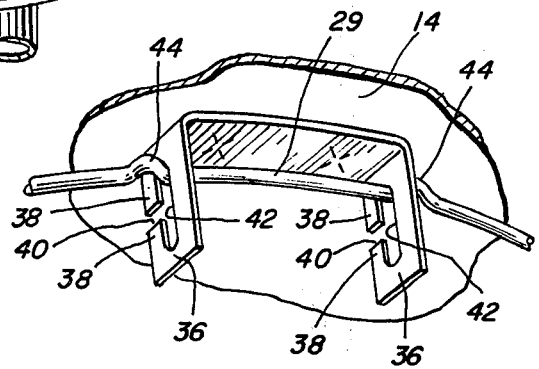
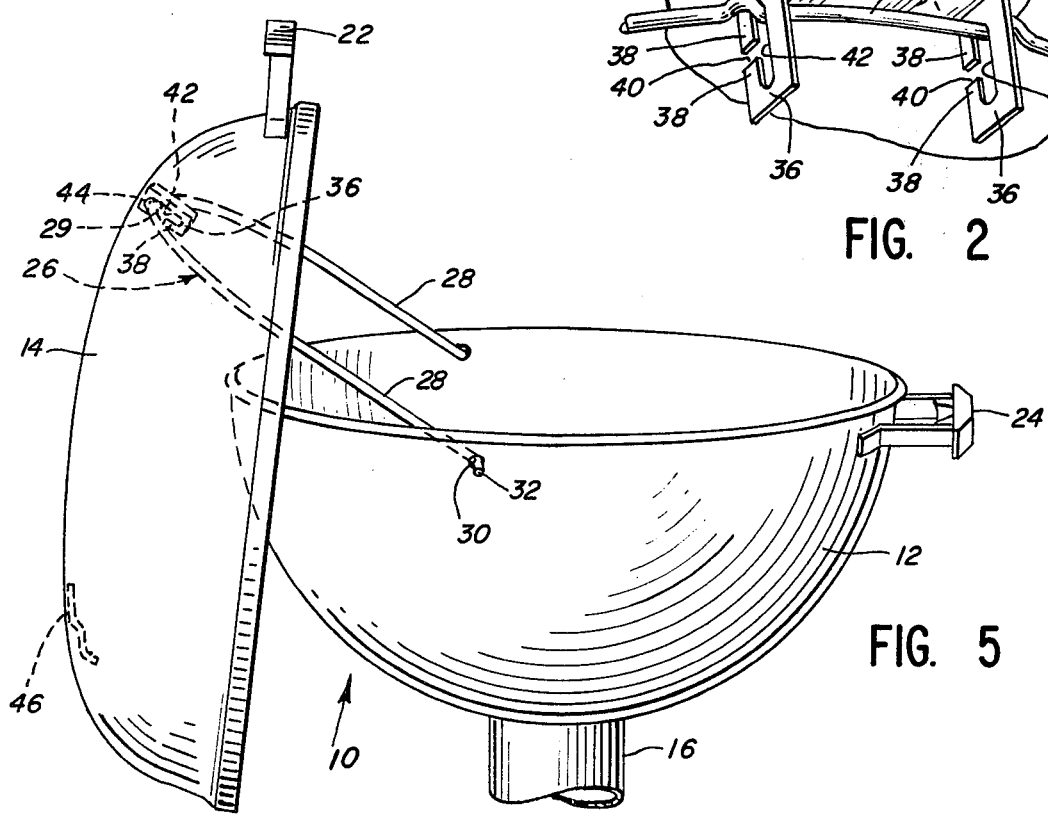

HINGE FOR COVER OF KETTLE COOKER

FIELD OF INVENTION

This invention relates to a kettle cooker barbecue grill, and more particularly to such a grill having an internal attaching a dome-shaped cover to a generally hemispherical kettle.

BACKGROUND OF THE INVENTION

Barbecue grills in the form of kettle cookers in which a cover is directly hinged to the kettle by a pair of external hinge means, each one of the pair being located on an opposing side of the kettle, are known in the prior art. Examples are the U.S. patent to Glaser et al. No. 3,611,915 (FIGS 11-13), the U.S. patents to Wiggins Nos. 3,617,022 (FIG. 5) and 3,692,012 (FIG. 5), and the U.S. patent to Linstead No. 3,714,937 (FIG. 2). In some of the grills, the kettle and its cover must both be of the same spherical shape but of somewhat different dimensions, and because of the latter fact they cannot form a tight closure even when brought into their fully closed position. In all four patents just mentioned, the hinges protrude in an inconvenient manner.

Barbecue cookers of the kettle type in which the cover is secured to the kettle by a single external hinge are also known in the prior art. U.S. Pat. No. 3,611,915 to Glaser et al. (FIGS. 1-10 and 14-17) is an example. The external hinge linkage of such cookers is complicated, unattractive in appearance, and inconvenient because of protruding members (such as mounting screws 25, hinges 28 and detents 40 of the Glaser et al. kettle cooker).

Several barbecue grills that are not of the hemispherical of kettle cooker type, but instead have generally vertical side walls, utilize internal hinges comprising an arrangement of two members pivotally attached at top and bottom to the kettle and its cover. Together with connecting portions of the generally vertical walls of the upper and lower halves of the cooker, these members form a quadrilateral linkage that changes shape as the cover is moved from the closed position to partially open position, and then to completely open position. Examples of grills with hinges of this type are the grills with generally rectangular cross-sections that are sold by Neosho Products Company under the trademark "Buddy L" and those that are sold by Sears Roebuck and Co. under the trademark "Kenmore".

Because the walls of the dome-shaped cover of a kettle cooker are curved in both the horizontal and vertical planes that would pass through the respective pivot points of the two pivoted members of such hinges if one attempted to use them with a kettle cooker, the hinges would bind as the curved walls prevented free movement of the links. Such hinges would thus be inoperable with kettle cookers.

Another barbecue grill with generally vertical side walls, shown in U.S. Pat. No. 3,938,493 to Bauer, utilizes a single hinge member on each side of the grill. The hinge is, again, free to pivot only because of the generally vertical side walls of the grill basin, and thus would be inoperable with a kettle cooker.

All the disadvantages of the prior art devices mentioned above are avoided, and important advantages are achieved, with the kettle cooker hinge of this invention.

SUMMARY OF THE INVENTION

The kettle cooker hinge of this invention includes two spaced legs joined by a bight section to form an inverted U-shaped member. The hinge has fully closed, partially open, and fully open positions.

Means are provided to pivotally secure the lower end of each of the legs to the inner wall of the kettle at opposite sides of the kettle, preferably spaced from each other by an angular distance of about 150°, with the locations of these pivot means lying in a first pair of adjacent quadrants of the kettle. As used in this specification and the appended claims, the term "kettle" is used to refer to the generally hemispherical bottom portion of the grill, and the term "kettle cooker" is used to refer to the entire grill, including both the kettle and its cover.

Means to pivotally secure the bight at the upper end of the inverted U-shaped member to the inner wall of the cover is provided at a location, when the cover is in its closed position, directly above the other two quadrants of the kettle. To provide stability, this latter pivot means extends on opposite sides of the vertical plane that divides the other two quadrants of the kettle just mentioned.

The pivot means at the upper end of the inverted U-shaped member is located adjacent the rim of the cover. The cover carries an external handle that may be adjacent that pivot means, for grasping by the user when opening and closing the cover.

In the preferred embodiment of this kettle cooker hinge, the pivot means at the upper end of the inverted U-shaped member is a hook means adapted to hold the bight of that member in one end of an elongated slot when the cover is in a partially or fully opened position, and in the other end of the slot when the cover is in its closed position. An opening in the hook means provides access to the elongated slot so that the bight may be inserted into or removed from the elongated slot as desired. To prevent sidewise movement of the bight in the hook means, the bight carries a pair of protuberances located adjacent the hook means.

When the kettle cover and hinge have been pivoted to their fully open positions, the bight of the inverted U-shaped member lies outside the kettle cooker. In other words, the legs of the hinge are sufficiently long to permit the cover, when the hinge is in its fully open position, to swing free of the kettle into an upright position at the side of the kettle.

Another feature of the kettle cooker hinge of this invention is the inclusion of a clip means for detachable connection with the rim of the kettle. The clip means is mounted on the inner wall of the cover spaced from the location where the bight at the upper end of the inverted U-shaped member is pivotally secured to the cover. This clip means may be used to hold the cover in a generally upright position short of swinging the kettle cover completely free of the kettle into a fully upright position. The clip means is preferably a single clip location in a position where it is bisected by the vertical plane that divides the first pair of adjacent quadrants of the kettle referred to above.

The inverted U-shaped member of this hinge is preferably formed of stiff wire, with the lower end of each of the legs of the hinge bent to be received by an aperture defined in the wall of the kettle.

BRIEF DESCRIPTION OF THE DRAWINGS

The invention will now be described by reference to the attached drawings, in which:

FIG. 2 (on the same sheet as FIGS. 4 and 5) is an enlarged, fragmentary perspective view of the upper pivot means for the kettle cooker hinge of FIG. 1;

FIG. 2A (also on the same sheet as FIGS. 4 and 5) is a fragmentary perspective view of an alternative embodiment of the upper pivot means for the kettle cooker hinge of FIG. 1;

FIG. 4 is a three-quarters perspective view of the barbecue grill of FIG. 1, with the cover shown in the process of being moved into completely opened position; and FIG. 5 is a side perspective view of the barbecue grill of FIG. 1 after the cover has been moved into its completely opened position.

DETAILED DESCRIPTION OF EMBODIMENTS DISCLOSED

Figure 1:
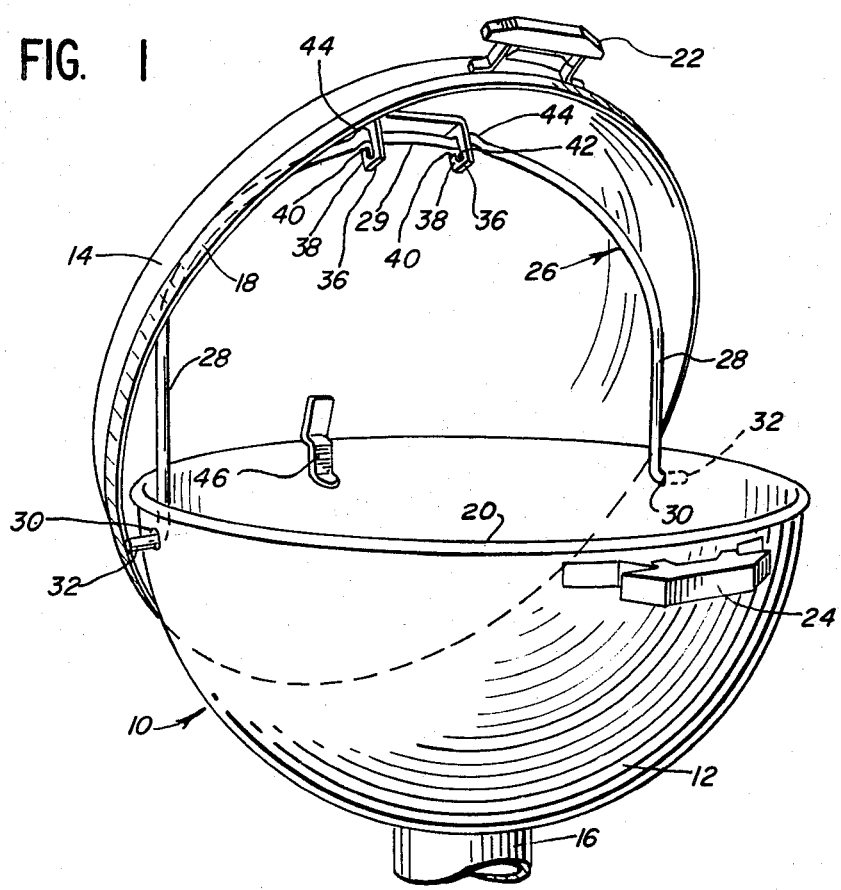
FIG. 1 is a three-quarters perspective view of a barbecue grill embodying the kettle cooker hinge of this invention, with the cover secured in partially open position.

In FIG. 1, barbecue grill 10 is comprised of generally hemispherical kettle 12 and dome-shaped cover 14. Kettle 12 is supported on vertical pedestal 16.

When cover 14 is closed, rim 18 of cover 14 forms a close fit with rime 20 of kettle 12. Handle 22 is utilized to lift cover 14, and handle 24 is utilized to move the grill about from one location to another upon the wheels (not shown) at the bottom of its pedestal 16. If desired, the handle for the cover may be at any other suitable location such as, for example, the center of the outer wall of the cover.

Kettle cooker hinge 26 of this invention includes two spaced legs 28 joined by bight section 29 to form an inverted U-shaped member. In the embodiment shown, U-shaped member 26 is formed of stiff wire.

Hinge 26 has fully closed, partially open, and fully open positions. When the hinge is in its fully open position, bight 29 lies outside kettle 12. In other words, legs 28 are sufficiently long to permit cover 14 to swing free of kettle 12 (as shown in FIGS. 4 and 5) into an upright position at the side of the kettle.

The lower end of each leg 28 is pivotally secured to the inner wall of kettle 12 at opposite sides of the kettle. The locations at which the lower ends of legs 28 are pivotally secured to the kettle lie in a first pair of adjacent quadrants of said kettle located on the left-hand side of FIGS. 3 and 5. The pivot means for the lower ends of legs 28 are spaced from each other by an angular distance of about 150° in the embodiment shown in the drawings.

In the embodiment shown, the pivot means for the lower end of each of legs 28 includes an aperture 30. The lower end of each of legs 28 is bent at 32 to be received by one of apertures 30.

Bight 29 at the upper end of inverted U-shaped member 26 is pivotally secured to the inner wall of cover 14. This is accomplished by hook means 36 located adjacent rim 18 of cover 14, directly above, when the cover is in its closed position on the kettle, the other two quadrants of kettle 12 (on the right-hand side of FIGS. 3 and 5). To provide stability, hook means 36 extends on opposite sides of the vertical plane that divides the other two quadrants of kettle 12 just referred to.

In the embodiment shown, hook means 36 includes at least one bight-receiving slot defined by reentrant hook ends 38. As best seen in FIG. 2, this embodiment includes two pairs of reentrant hook ends 38 spaced from each other along bight 29. Each pair of reentrant hook ends 38 defines an opening 40 through which bight 29 may be inserted or withdrawn as desired, and at the same time defines an elongated slot 42 in communication with opening 40.

Each elongated slot 42 is disposed in a position generally normal to the inner wall of cover 14. As seen in the various Figures of the drawings, when the cover is moved by the user of the grill into a partially or fully open position, the weight of the cover keeps bight 29 seated in the upper end of each elongated slot 42. When cover 14 is closed, bight 29 drops into the lower end of slots 42, and remains seated in those slots until the user grasps handle 22 and swings cover 14 and hinge 26 upward, when the weight of the cover again maintains bight 29 seated in the upper ends of slots 42.

Bight 29 thus tends to remain seated in slots 42 during movement of cover 14 in a partially or fully open position, unless the user of the barbecue grill intentionally aligns the bight with openings 40 for passage therethrough. With bight 29 aligned with openings 40, cover 14 may be readily separated from hinge 26 and removed from the grill.

FIG. 2A provides a fragmentary perspective showing of an alternative embodiment, in the form of hook means 36', of the upper pivot means for hinge 26. In this embodiment, hook end 38' defines elongated slot 42' for receiving bight 29, and opening 40' at one end of the slot. The weight of cover 14 keeps bight 29 seated in the upper end of each elongated slot 42' when the cover is moved by the user of the grill into a partially or fully open position. When cover 14 is closed, bight 29 drops into the lower end of the slot, where the length of legs 28 keeps the bight seated in the slot.

In the embodiments shown, the wire of hinge 26 that comprises bight 29 is crimped on either side of hook means 36 to form a pair of protuberances 44 that prevents sidewise movement of the bight in hook means 36.

Clip means 46 is mounted on the inner wall of cover 14 for detachable connection with rim 20 of kettle 12. It is mounted on the inner wall of the cover spaced from the location where bight 29 at the upper end of inverted U-shaped member 26 is pivotally secured to cover 14. In use, clip 46 holds cover 14 in a generally upright position which is short of swinging the kettle cover completely free of kettle 12 into a fully upright position.

Figure 3:
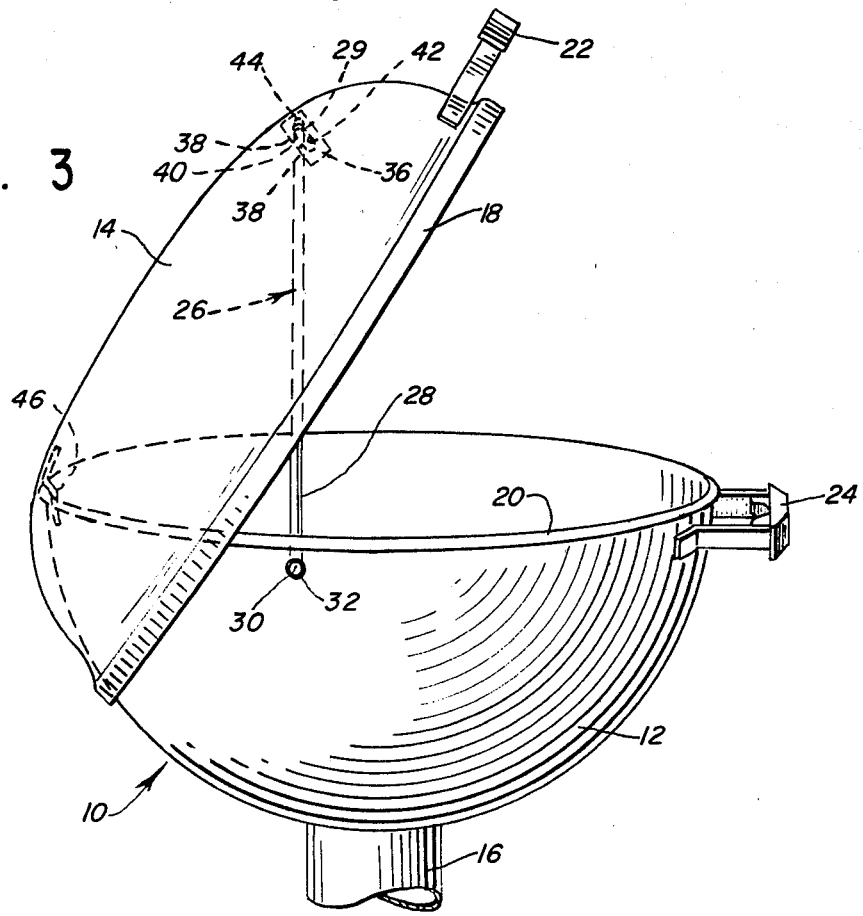
FIG. 3 is a side perspective view of the barbecue grill of FIG. 1.

In the embodiment shown, clip means 46 is a single clip located in a position where it is bisected by the vertical plane that divides the pair of adjacent quadrants of kettle 12 referred to above that are located on the left-hand side of FIGS. 3 and 5.

Clip 46 is shown in FIGS. 1 and 3 holding the cover 14 in the generally upright position described above. In FIG. 4, clip 46 has been released from rim 20 of kettle 12, and the user has moved cover 14 in the direction of the arrow there shown. In both FIGS. 4 and 5, legs 28 of inverted U-shaped member 26 have swung into a position in which kettle rim 20 acts as a stop for further motion of each leg. In this position, when cover 14 is freely suspended from hinge member 26 it occupies a substantially vertical position.

The hinge of this invention provides stability, with a minimum amount of effort, during opening and closing of the kettle cover. The hinge also presents a minimum risk of accidental or inadvertent closing of the cover. No additional supports are required on the lid other than the hinge mechanism itself to hold the cover securely in its fully open position. In the preferred embodiment, a single clip holds the cover in thr intermediate open position described above. Finally, the hinge is simple in construction and can be readily assembled and disassembled, as the user desires, without any special tools.

The above detailed description of this invention has been given for ease of understanding only. No unnecessary limitations should be understood therefrom, as modifications will be obvious to those skilled in the art.

I claim:

1. A covered kettle cooker barbecue grill comprising a hinge for attaching a cover to a kettle to permit moving the cover between closed and open positions,
   (a) the kettle being a generally hemispherical barbecue grill kettle;
   (b) the cover being a generally circular dome-shaped cover for said kettle, said cover having a rim; and
   (c) the hinge being for attaching said cover to said kettle, said hinge being disposed within said grill and including:
   (i) two spaced legs joined by a bight to form an inverted U-shaped member, each of said legs being shaped to be disposed adjacent to the rim along the underside of said dome-shaped kettle cooker cover, and to conform generally to the shape of said rim, when said cover is in the closed position upon said kettle, said legs being free of any braces connecting said legs to each other, said U-shaped member having fully closed, partially open, and fully opened positions;
   (ii) means pivotally securing the lower end of each of said legs to the inner wall of said kettle at opposite sides of the kettle, the locations at which the lower ends of said spaced legs are pivotally secured to said kettle lying in a first pair of adjacent quadrants of said kettle; and
   (iii) means pivotally securing the bight, which is at the upper end of said inverted U-shaped member, to the inner wall of said cover at a location that is adjacent the outer perimeter of said dome-shaped cover, and is directly above the other two quadrants of said kettle when said cover and said inverted U-shaped member are in their closed positions, said means pivotally securing the bight extending on opposite sides of the vertical plane that divides said other two quadrants of said kettle, said bight lying outside said kettle when said inverted U-shaped member is in the fully open position.

2. The kettle cooker barbecue grill of claim 1 in which the locations at which the lower ends of said legs are pivotally secured to said kettle are spaced from each other by an angular distance of about 150°.

3. The kettle cooker barbecue grill of claim 1 in which said cover carries an external handle adjacent said means pivotally securing the bight at the upper end of said inverted U-shaped member to the inner wall of said cover.

4. The kettle cooker barbecue grill of claim 1 which includes clip means for detachable connection with the rim of said kettle, said clip means being mounted on the wall of said cover spaced from the location where said bight at the upper end of said inverted U-shaped member is pivotally secured to said cover, to hold said cover in a generally upright position short of swinging the kettle cover completely free of said kettle into a fully upright position.

5. The kettle cooker barbecue grill of claim 4 in which said clip means is a single clip located in a position where it is bisected by the vertical plane that divides said first pair of adjacent quadrants of said kettle.

6. The kettle cooker barbecue grill of claim 1 in which said U-shaped member is formed of stiff wire and said means pivotally securing the lower end of each of said spaced legs to the inner wall of said kettle comprises two apertures defined by the wall of said kettle cooker, the lower end of each of said legs being bent to be received by one of said apertures.

7. The kettle cooker barbecue grill of claim 1 in which said means for securing the bight at the upper end of said inverted U-shaped member to the inner wall of said cover includes hook means mounted on said cover for detachably and pivotally securing said bight.

8. The kettle cooker barbecue grill of claim 7 in which said hook means defines at least one elongated slot for receiving the bight of said inverted U-shaped member when said cover is secured to said kettle, and includes a pair of reentrant hook ends that defines an opening that provides access to said at least one elongated slot for insertion of said bight into said slot or removal of the same therefrom as desired.

9. The kettle cooker barbecue grill of claim 8 in which said at least one elongated slot is disposed in a postion generally normal to the inner wall of said kettle cover, whereby said bight at the upper end of said inverted U-shaped member is seated in the upper end of said slot when said cover is in a partially or fully open position and is seated in the lower end of said slot when said cover is in its closed position.

10. The kettle cooker of claim 8 in which said hook means includes two pairs fo said reentrant hook ends, said pairs being spaced from each other along said bight at the upper end of said inverted U-shaped member.

11. The kettle cooker barbecue grill of claim 7 in which said hook means defines at least one elongated slot for receiving the bight of said inverted U-shaped member when said cover is secured to said kettle, and includes a reentrant hook end that defines an opening that provides access to one end of said elongated slot for insertion of said bight into said slot or removal of the same therefrom as desired.

12. The kettle cooker barbecue grill of claim 11 in which said at least one elongated slot is disposed in a position generally normal to the inner wall of said kettle cover, whereby said bight at the upper end of said inverted U-shaped member is seated in the upper end of said slot when said cover is in a partially or fully open position and is seated in the lower end of said slot when said cover is in its closed position.

13. The kettle cooker of claim 11 in which said hook means includes two of said reentrant hook ends, said hook ends being spaced from each other along said bight at the upper end of said inverted U-shaped member.

14. The kettle cooker barbecue grill of claim 7 in which said bight carries a pair of protuberances to prevent sidewise movement of the bight in said hook means.

15. A hinge for a kettle cooker barbecue grill for attaching a generally circular dome-shaped cover to generally hemispherical kettle to permit moving said cover between closed and open positions, said cover having a rim, said hinge comprising:

two spaced legs joined by a bight to form an inverted U-shaped member formed of stiff wire, said member having fully closed, partially open, and fully open positions;

means pivotally securing the lower end of each of said legs to the inner wall of said kettle at opposite side of the kettle, the locations at which the lower ends of said legs are pivotally secured to said kettle lying in a first pair of adjacent quadrants of said kettle and spaced from each other by an angular distance of about 150°, said pivot means comprising two apertures defined by the wall of said kettle cooker, the lower end of each of said legs being bent to be received by one of said apertures;

means pivotally securing the bight, which is at the upper end of said inverted U-shaped member, to the inner wall of said cover at a location that is adjacent the rim of said cover directly above the other two quadrants of said kettle when said cover and said inverted U-shaped member are in their closed positions, said means pivotally securing the bight comprising hook means for detachably securing said bight to the cover, said hook means extending on opposite sides of the vertical plane that divides said other two quadrants of said kettle, defining a pair of elongaged slots positioned generally normal to the inner wall of said cover for holding the bight of said inverted U-shaped member when said cover is secured to said kettle, and including a pair of reentrant hook ends associated with each of said slots, each pair of reentrant hook ends defining an opening that provides access to the elongated slot for insertion of said bight into said slot or removal of the same therefrom as desired;

a pair of protuberances carried by said bight to prevent sideways movement of the bight in said hook means;

clip means for detachable connection with the rim of said kettle, said clip meanss being mounted on the inner wall of said cover spaced from the location where said bight at the upper end of said inverted U-shaped member is pivotally secured to said cover, to hold said cover is a generally upright position short of swinging the kettle cover completely free of said kettle into a fully upright position, said clip means being a single clip located in a position where it is bisected by the vertical plane that divides said first pair of adjacent quadrants of said kettle; and an external handle mounted on said cover adjacent said means pivotally securing the bight at the upper end of said inverted U-shaped member to the inner wall of said cover.

* * * * *